United States Patent

[11] 3,622,976

[72] Inventor John L. Howard
 12802 N. 23rd St., Phoenix, Ariz. 85022
[21] Appl. No. 42,080
[22] Filed June 1, 1970
[45] Patented Nov. 23, 1971

[54] MALFUNCTION WARNING SYSTEM FOR PRESSURIZED COOLING SYSTEMS
 6 Claims, 6 Drawing Figs.
[52] U.S. Cl. .................................................. 340/60,
 340/240, 200/83
[51] Int. Cl. .................................................. B60q 1/00,
 G08b 21/00
[50] Field of Search .......................................... 340/52, 52
 F, 59, 60, 240, 242; 200/81, 82, 83

[56] References Cited
 FOREIGN PATENTS
 284,595 4/1931 Italy .......................... 340/60

Primary Examiner—Alvin H. Waring
Attorney—Knox & Knox

ABSTRACT: A warning system sensitive to loss of pressure as well as undue temperature rise in cooling systems such as in motor vehicle engines. A capsule with a diaphragm-operated electric circuit control senses the pressure loss and this is conveniently connected in the usual temperature-sensing probe circuit to provide a warning, ordinarily a lighted lamp in the driver's compartment. The pressure-sensing means is incorporated with the radiator cap or independently mounted on the radiator tank by means of a self-tapping nipple which supports the capsule carrying the pressure-sensing diaphragm.

INVENTOR.
JOHN L. HOWARD
BY
Knox & Knox

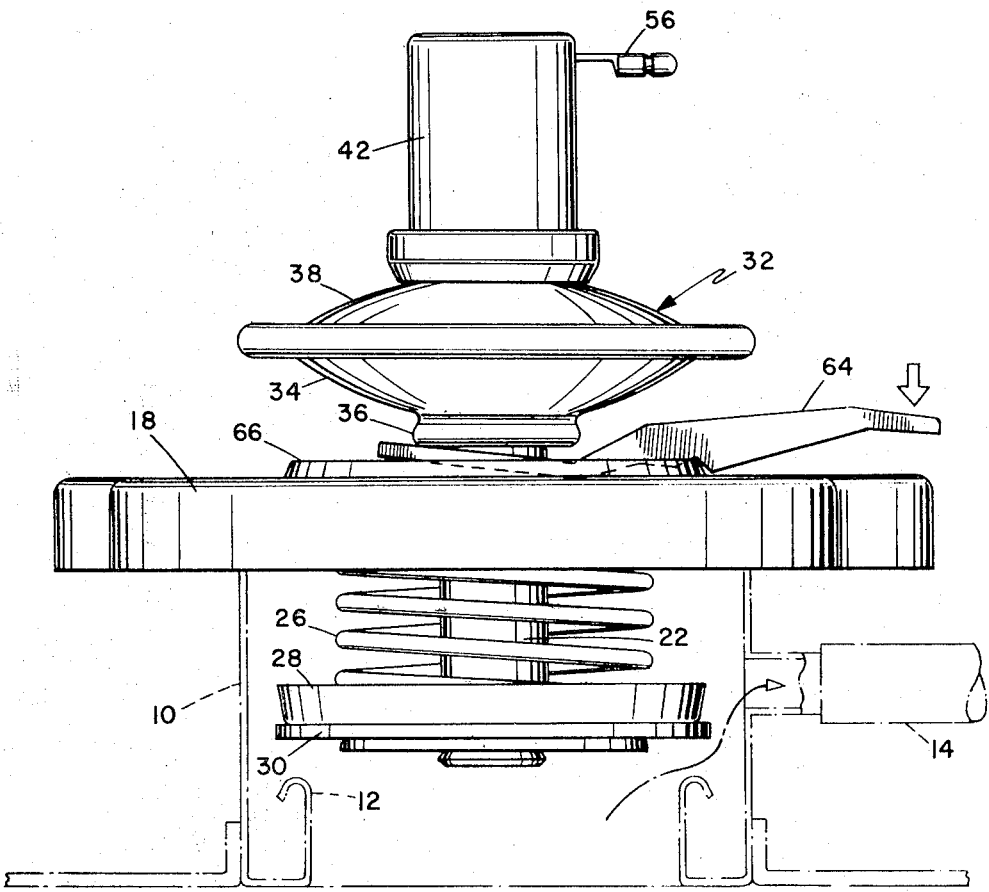
Fig. 4
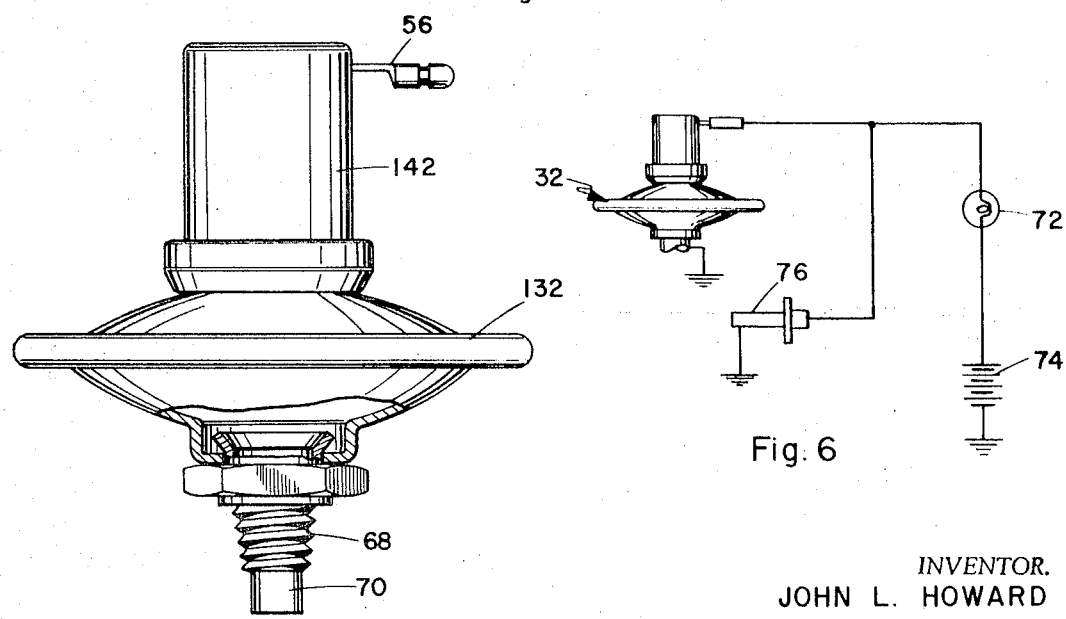
Fig. 5
Fig. 6
INVENTOR.
JOHN L. HOWARD
BY
Knox & Knox

MALFUNCTION WARNING SYSTEM FOR PRESSURIZED COOLING SYSTEMS

BACKGROUND OF THE INVENTION

Very frequently the ordinarily provided temperature gauge on motor vehicles fails to register significantly any increase in engine temperature resulting from loss of coolant if the water level in the system is low and the engine may be damaged by overheating. If the operator depends entirely upon the temperature gauge a "burned-out" engine may result. Whenever an engine is designed for optimal operation at a temperature well above 212° F a water or water-based pressurized coolant will tend to be expelled quickly, at least in part, upon rupture of the integrity of the system as when a water hose "blows" or the water pump or radiator has a break therein. On the other hand, even if no great loss of coolant has occurred it may be important to signal the fact that a cooling system designed to operate under pressure is not being pressurized, as for example when a radiator cap has not been properly replaced, the water pump belt is broken stopping circulation of coolant, or the coolant is frozen, thus signaling the malfunction before any great damage can occur.

SUMMARY OF THE INVENTION

A pressure sensor reflecting loss of pressure in the water or water-based cooling system of an engine, particularly as applied to automotive engines. The sensor includes a capsule with a diaphragm exposed to the coolant system and including circuit make-and-break means connected to a remote electrical warning signal such as a red lamp on the instrument board. The capsule is incorporated with a radiator cap or is independently attached to the radiator tank and it can be hooked up in parallel with an existing temperature-gauge.

SHORT DESCRIPTION OF THE DRAWINGS

FIG. 4 is an enlarged side elevation view showing the pressure relief action;

FIG. 5 is a side elevation view, partially cut away, of an alternative form of the sensor for installation in a radiator wall; and FIG. 6 is a simplified wiring diagram of the sensor in use.

DETAILED DESCRIPTION OF A PREFERRED EMBODIMENT

Figure 1:
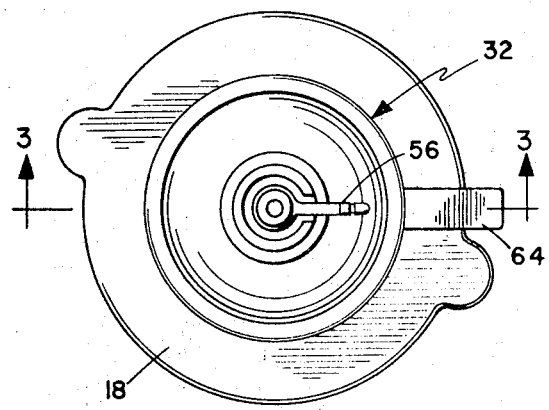
FIG. 1 is a top plan view of a radiator cap incorporating the pressure sensor.
Figure 2:
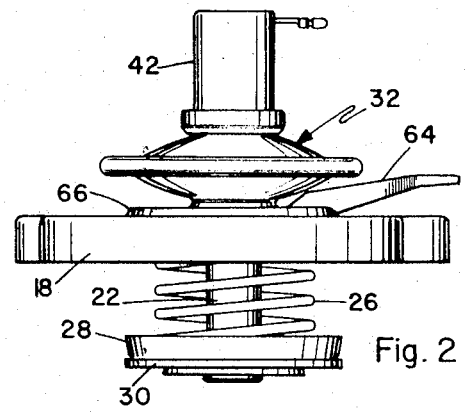
FIG. 2 is a side elevation view thereof.
Figure 3:
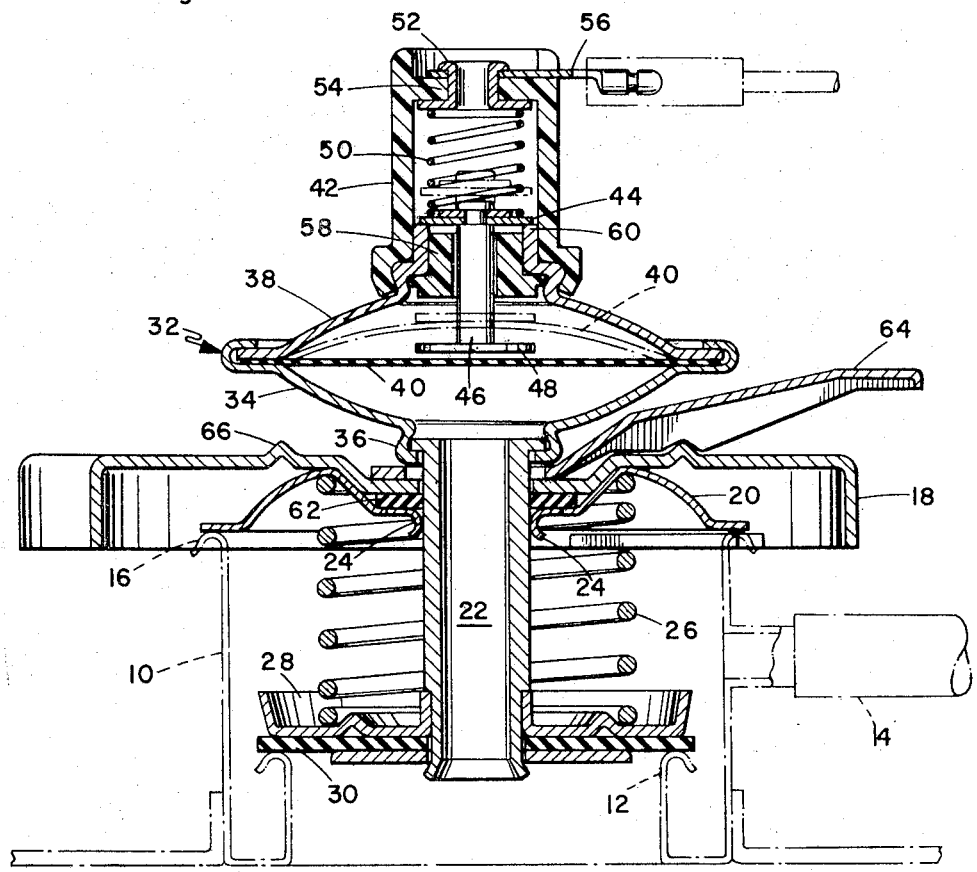
FIG. 3 is an enlarged sectional view taken on line 3—3 of FIG. 1.

Referring now to the drawings, the principal use of the invention is represented as application to the cooling system of automotive vehicle engines, the number 10 indicating fragmentarily an upper inlet portion of a radiator with the usual internal valve seat 12 and overflow pipe 14 and the usual complement of radiator cap locking flanges fragmentarily represented at 16, all of which elements are conventional.

A radiator cap 18 has fixed therein an inner downturned lock plate 20 with conventional partial flange structure to engage and lock onto the top of the radiator inlet 10, and both cap 18 and plate 20 are centrally apertured to provide a sliding fit for a pressure access tube 22. The inner edge of the plate 20 is split into fingers 24 terminally turned to minimize friction while assuring good electrical contact with the tube 22. The uppermost portion of the plate 20 defines a circular channel to locate the upper end of a pressure-regulating helical spring 26 arranged coaxially of the tube 22. The spring 26 is compressed between the plate 20 and a valve cup 28 which in turn depresses a washer 30 of a neoprene or the like into sealing relation with the inner valve seat 12 of the radiator inlet.

Supported on the upper end of the pressure access tube 22 is the capsule 32 comprised of a lower dished shell 34 fixed as at 36 to the tube 22, an upper, oppositely dished shell 38 with a flexible diaphragm 40 peripherally clamped therebetween. The upper shell 38 carries a cylindrical casing 42 which conveniently is constructed of plastic and therefore electrically insulative for housing a contact plate 44 fixed to the top of a plunger 46. To minimize possibility of damage to the diaphragm the plunger 46 is provided with an enlarged head 48 to distribute the load of the contact spring 50 which is compressed between the contact plate 44 and the rinet-type terminal 52 fixed on a depressed end plate 54 of the casing 42. Depression of the end plate 54 insures against inadvertent electrical contact of the terminal 52 and its lateral extension 56 equipped with a quick disconnect male element.

The plunger is slidingly supported by an axially bored plug 58 fixed within an upper neck portion the upper shell 38, this plug being insulative, and the upper end 60 of said neck portion of the upper shell, constitutes a lower contact for the contact plate 44 to provide an electrical path through the contact spring 50 to the contact plate 44, the metal capsule shells and the tube 22, to the lockplate 20 and the grounded radiator inlet 10.

It will, of course, be evident that the tube 22 must be reasonably free to slide to permit opening of the valve in the event of undue pressure buildup in the radiator, but a seal 60 is compressed between the cap 18 and plate 20 to prevent escape of pressurized coolant and/or steam when the valve is thus opened, or opened manually by the pressure release lever 64. This lever 64 is bifurcated to straddle the tube 22 just underneath the lower shell 34 of the capsule and the lever is pivoted on an upwardly dimpled rim 66 on the cap 18.

A modified form of this invention is illustrated in FIG. 5. In this embodiment the capsule 132 and casing 142 are identical to the capsule 32 and casing 42 but the tube 22 is modified to constitute a self-tapping nipple 68 with a pilot 70 for easy installment of the capsule on the wall of a radiator.

In either form the capsule with its pressure-sensitive diaphragm and electrical circuit make-and-break means is connected in series with a warning signal such as the lamp 72, a buzzer or the like usually remotely installed on the instrument panel of a vehicle, and a source of energy indicated at 74. It is preferred that the same be merely added to the existing temperature-sensing circuit with the conventional temperature gauge 76 and with the two sensors in parallel as in the simplified diagram of FIG. 6.

I claim as my invention:

1. A loss-of-pressure malfunction warning system for pressurized cooling systems of motor vehicle engines and the like, comprising:

a capsule having means for connection and communication with a normally pressurized portion of the cooling system;

a diaphragm operatively mounted in said capsule to respond to changes in pressure in the cooling system;

an electrically operated remote warning signal means; and a circuit make-and-break means in said capsule and connected in a circuit with said signal means and operated by said diaphragm said make-and-break means including electrical contacts normally spring biased to closed position and held open by said diaphragm while the colling system maintains normal operating pressure.

2. Apparatus according to claim 1 wherein said cooling system includes a radiator and radiator cap and said capsule is mounted on said radiator cap.

3. Apparatus according to claim 1 wherein said cooling system includes a radiator with a radiator tank and said means for connection and communication comprises a self-tapping nipple which is mounted on the radiator tank.

4. Apparatus according to claim 1 wherein said cooling system includes a radiator and radiator cap and said means for connecting and communicating comprises a tube fixed to and extending through said cap and communicating with one side of said diaphragm;

said make-and-break means comprising a plunger spring biased toward said diaphragm and carrying an electrical contact to close said circuit when the diaphragm is not deflected by pressure in the cooling system.

5. Apparatus according to claim 4 and including a valve element on said tube biased by a spring controlling the upper limit of pressure in the cooling system, and a lever operatively mounted on said cap for manual movement of said tube and capsule relative to the cap and consequent compression of said spring and movement of said valve element to relieve pressure in said cooling system.

6. Apparatus according to claim 1 and including a temperature-sensing means operatively mounted in said cooling system in parallel with said make-and-break means.

* * * * *